(12) United States Patent
Helmick

(10) Patent No.: US 10,025,522 B2
(45) Date of Patent: Jul. 17, 2018

(54) MEMORY INTERFACE COMMAND QUEUE THROTTLING

(71) Applicant: SanDisk Technologies Inc., Plano, TX (US)

(72) Inventor: Daniel Helmick, Broomfield, CO (US)

(73) Assignee: SanDisk Technologies LLC, Plano, TX (US)

( * ) Notice: Subject to any disclaimer, the term of this patent is extended or adjusted under 35 U.S.C. 154(b) by 7 days.

(21) Appl. No.: 15/099,653

(22) Filed: Apr. 15, 2016

(65) Prior Publication Data

US 2017/0300263 A1  Oct. 19, 2017

(51) Int. Cl.
*G06F 3/06* (2006.01)

(52) U.S. Cl.
CPC .......... *G06F 3/0634* (2013.01); *G06F 3/0625* (2013.01); *G06F 3/0679* (2013.01)

(58) Field of Classification Search
None
See application file for complete search history.

(56) References Cited

U.S. PATENT DOCUMENTS

| 2012/0047317 A1* | 2/2012 | Yoon | G06F 3/0613 |
| | | | 711/103 |
| 2012/0047320 A1* | 2/2012 | Yoo | G06F 3/0616 |
| | | | 711/103 |
| 2012/0331207 A1* | 12/2012 | Lassa | G06F 1/3278 |
| | | | 711/103 |
| 2013/0007380 A1* | 1/2013 | Seekins | G06F 3/0679 |
| | | | 711/154 |
| 2015/0261473 A1* | 9/2015 | Matsuyama | G06F 3/0625 |
| | | | 711/103 |

\* cited by examiner

*Primary Examiner* — Prasith Thammavong
*Assistant Examiner* — Edmund H Kwong
(74) *Attorney, Agent, or Firm* — Brinks Gilson & Lione

(57) ABSTRACT

A storage device with a memory may implement command throttling in order to control power usage. The throttling may be based on modifications of certain memory parameters, such as a reduction in clock rate, bus speed, operating voltage, or command type changes. The throttling may be performed at a back end or memory interface of the storage device such that the memory interface receives un-throttled commands and can optimally throttle all of the commands from the front end.

16 Claims, 15 Drawing Sheets

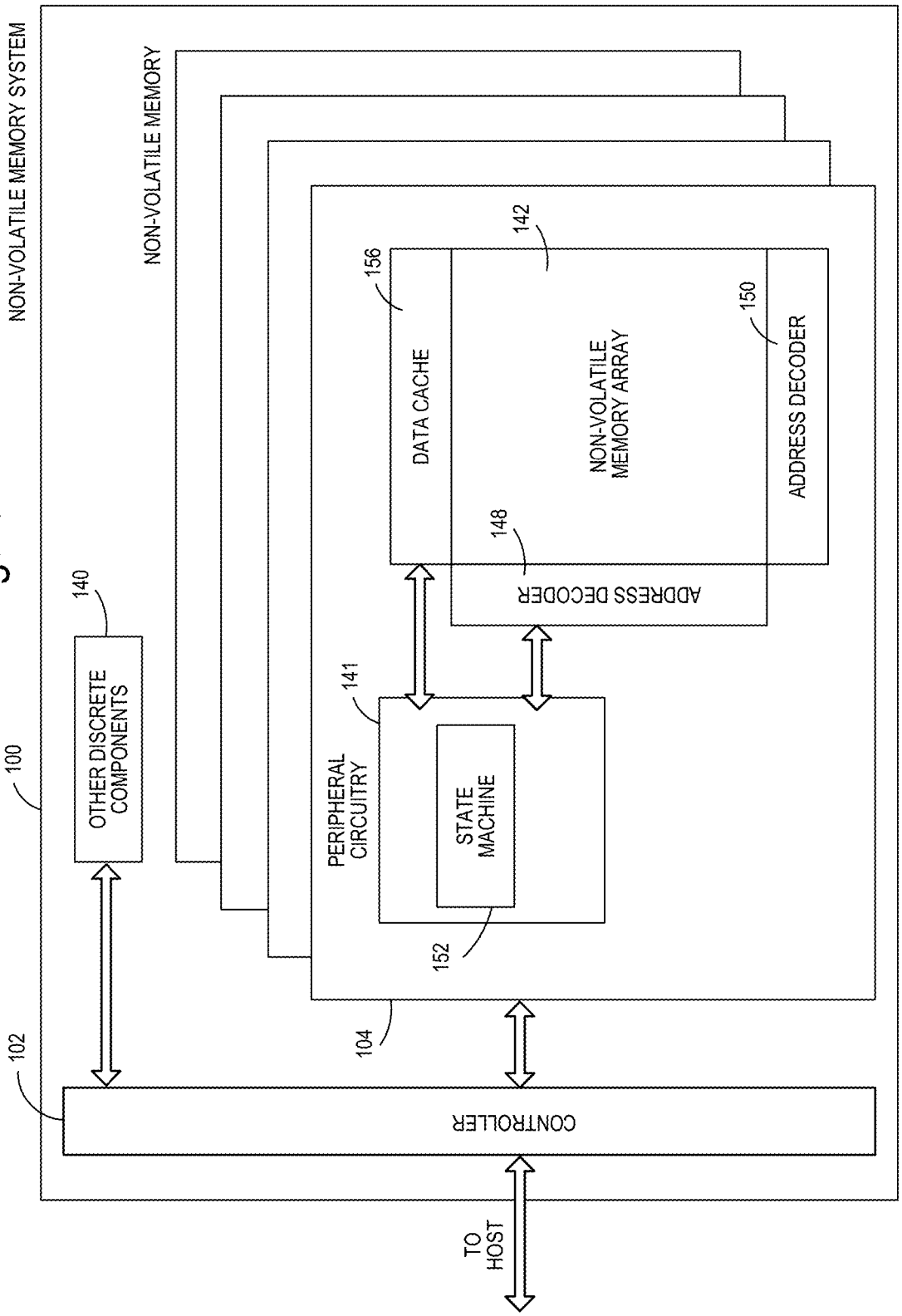

Result:
Maximum active die is reduced or more choppy behavior while waiting to aggregate commands.

Result:
Number of active die is equivalent or increased but the power requirements each uses is reduced

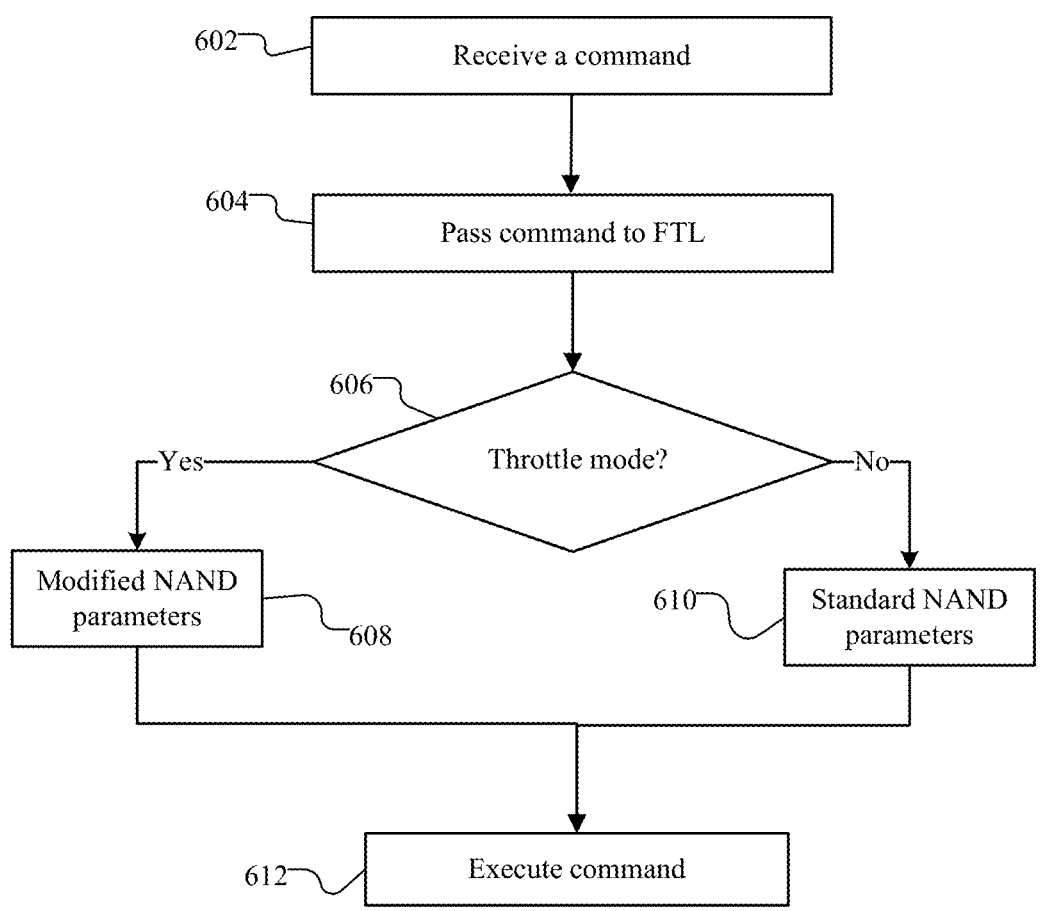

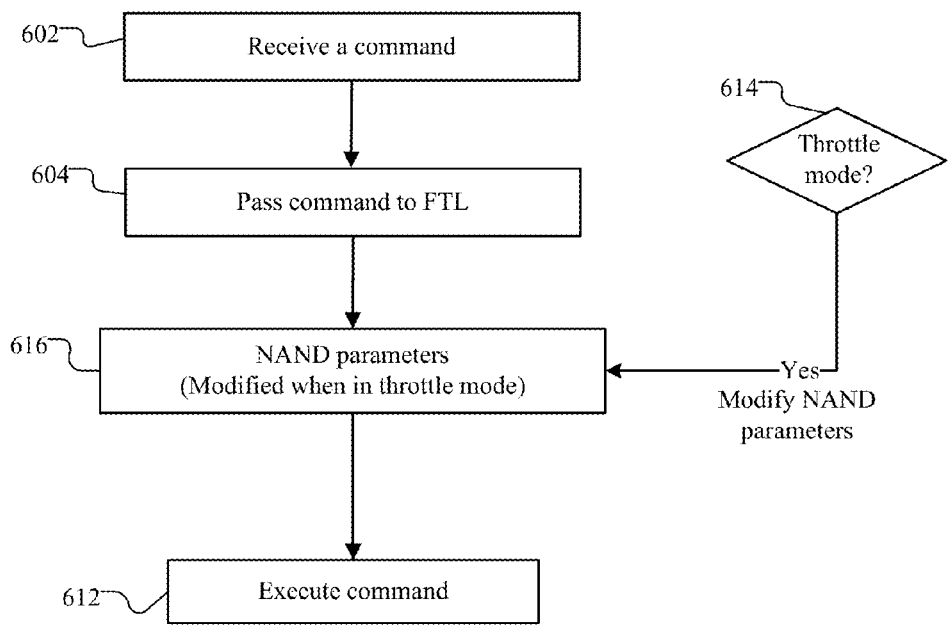

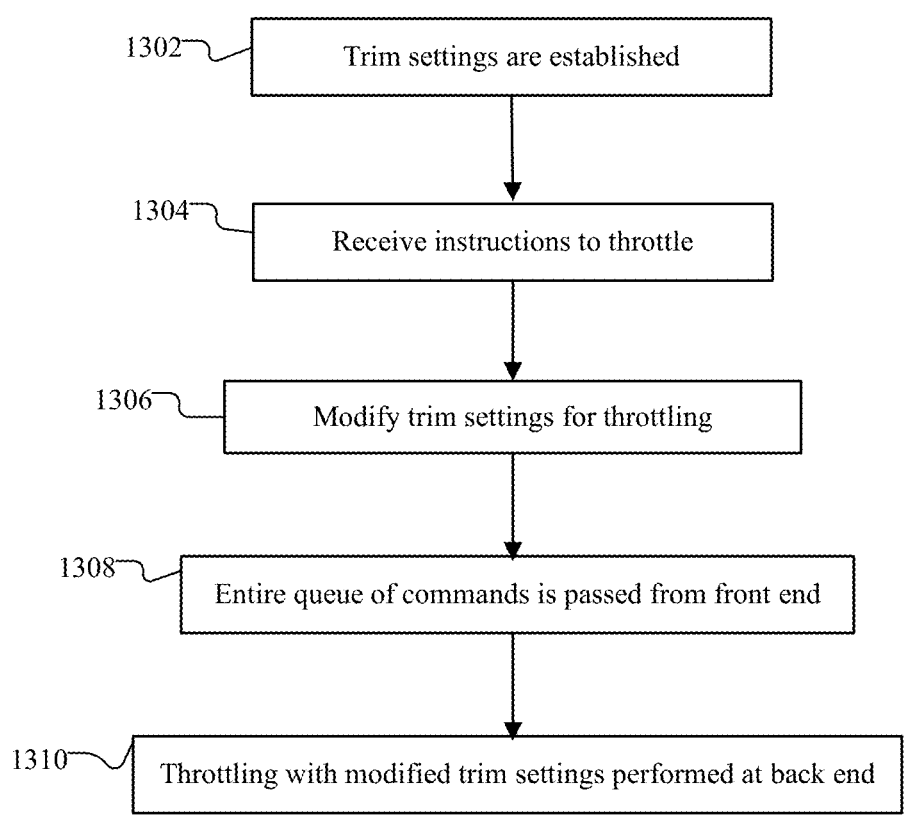

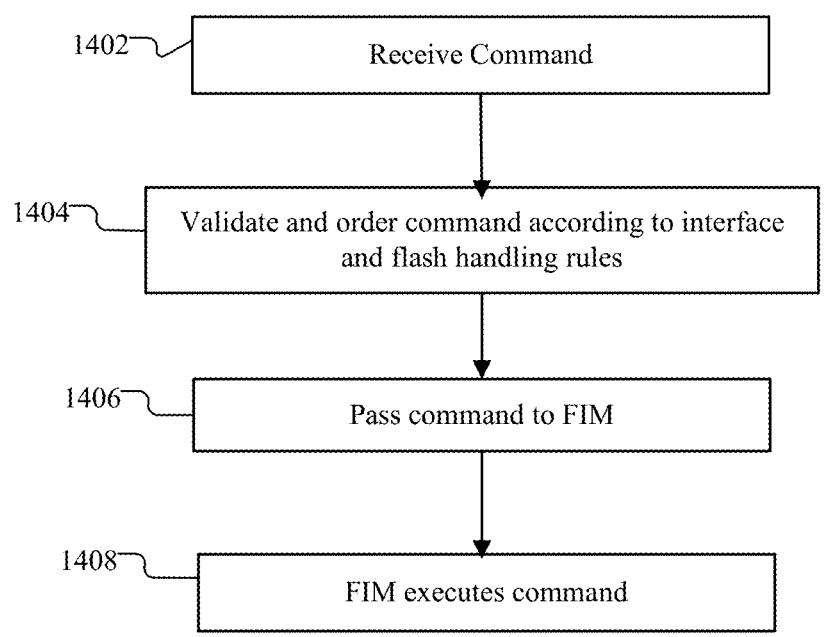

MEMORY INTERFACE COMMAND QUEUE THROTTLING

TECHNICAL FIELD

This application relates generally to memory devices. More specifically, this application relates to command queue throttling at a back end of the memory device.

BACKGROUND

Non-volatile memory systems, such as flash memory, have been widely adopted for use in consumer products. Flash memory may be found in different forms, for example in the form of a portable memory card that can be carried between host devices or as a solid state disk ("SSD") embedded in a host device. The SSD may be throttled for various reasons. The purpose of throttling may be to limit power consumption, monitor/control temperature, extend the memory endurance, or achieve more consistent memory performance. Accordingly, performance variations, high temperatures, or power overages may be a reason to throttle. The throttling may include slower command handling, extra command handling, or reducing endurance capabilities of the SSD. The SSD controller receives commands, such as read commands or write/program commands, from a host. There may be a command queue for when the controller has commands waiting for execution. However, when the queue is saturated with too many commands (e.g. during throttling), performance of the SSD may suffer because the commands are not executed promptly.

Merely reducing the number of commands to the memory device may be one way to throttle the SSD. In particular, the number of commands provided to the back end that executes the command may be reduced, which reduces total throughput. However, that prevents the memory device from performing as quickly and efficiently as possible. Both the number and rate of commands passed to the backend processor may be limited. Choking of the queue depth ("QD") revealed to the back end may have several adverse consequences. First, the stalling of commands within the host processor decreases bandwidth and throughput, which means fewer commands are sent in a continual basis to the memory. The reduced throughput of the memory device may reduce the resulting temperature and power, but the reduced queue depth available for examination may result in non-optimal decisions and increased outliers affecting command quality of service (QoS). This also does not extend to beginning of life ("BOL") performance variation. The BOL performance variation may be due to the variation in bad blocks from drive to drive such that some drives may have fewer bad blocks than others. Therefore, a drive with an unusually poor bad block distribution may have lower over provisioning, higher write amp, and lower performance. Throttling the performance of the good drives may be necessary to produce drives with minimal performance variation. Throttling by choking the queue depth to the back end means that the commands stalled in the front end receive a hit to their latencies. This may be a direct impact on Quality of Service ("QoS") which may result in unacceptable performance standards. The BOL performance variation may require equal QoS and bandwidth on all metrics.

SUMMARY

A storage device with a memory may implement command throttling for a variety of reasons such as to control power usage, protect from overheating, or modify performance. The throttling may be based on modifications of certain memory parameters, such as a reduction in clock rate, bus speed, operating voltage, or command type changes. The throttling may be performed at a back end or memory interface of the storage device such that the memory interface receives un-throttled commands and can optimally throttle all of the commands from the front end. In particular, the throttling may be moved away from a host interface to a back end of the memory device. In particular, for NAND memory, the host does not perform the throttling, rather, it is the NAND memory processor that controls the throttling. Accordingly, the memory device can control the flow of commands without the host. In other words, the host interface may not perform the throttling and passes the commands to the memory, which can then throttle (if necessary) on the back end.

BRIEF DESCRIPTION OF THE DRAWINGS

FIG. 2B is a block diagram of exemplary components of a non-volatile memory of a non-volatile memory storage system.

FIG. 6a is a flow chart for executing throttle mode.

FIG. 6b is a flow chart for an alternative embodiment for executing throttle mode.

FIG. 13 is a flow chart for setting memory parameters.

FIG. 14 is a flow chart for executing commands.

DESCRIPTION OF THE EMBODIMENTS

There may be customer requirements that result in throttling being necessary. At the beginning of life ("BOL"), there may be variations in devices and throttling may be used to remove the variance in performance. Likewise, there may be customer requirements on quality of service that can also be addressed through throttling. Throttling may also be used to control the bandwidth. The rate of heat generation in a high temperature environment can also be addressed through throttling. Temperature throttling may occur based on temperature detection (e.g. a hot environment) to prevent overheating. This throttling may be referred to as thermal throttling, which covers throttling to control heat generation. Conversely, power throttling may refer to controlling power.

Rather than limiting commands, functional pieces of the controller may be shut down. Since major thermal and power demands are in the NAND memory, the shutting down of hardware in the controller may be an indirect method for reducing NAND activity. However, not all controllers have refined power off capabilities on all hardware pieces. Drive performance may be reduced depending on the impact of the hardware shut off. Consequently, if that particular piece of hardware is not a bottleneck in the current drive workload (that does not hurt drive performance), then there may be no effective throttling of NAND memory activity.

As described herein, the throttling may be moved away from a host interface to a back end of the memory device. In particular, for NAND memory, the host does not perform the throttling, rather, it is the NAND memory processor that controls the throttling. Accordingly, the memory device can control the flow of commands without the host. In other words, the host interface may not perform the throttling and passes the commands to the memory, which can then throttle (if necessary) on the back end.

Figure 1A:
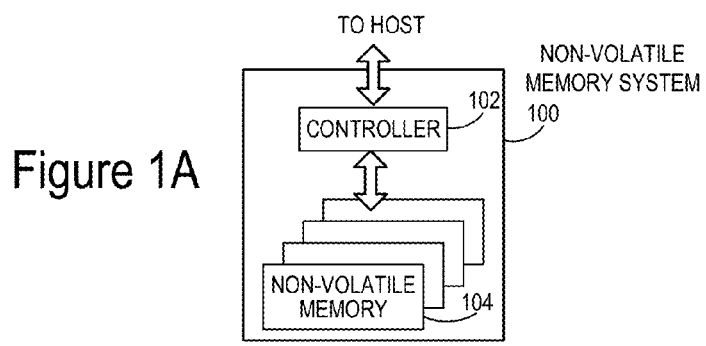
FIG. 1A is a block diagram of an example non-volatile memory system.

FIGS. 1A-2B are exemplary memory systems which may implement software queueing that can supplement hardware accelerated queueing mechanisms. FIG. 1A is a block diagram illustrating a non-volatile memory system. The non-volatile memory system 100 includes a controller 102 and non-volatile memory that may be made up of one or more non-volatile memory die 104. As used herein, the term die refers to the set of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104. The non-volatile memory die 104 may store an operating system for the host.

Examples of host systems include, but are not limited to, personal computers (PCs), such as desktop or laptop and other portable computers, datacenter server, tablets, mobile devices, cellular telephones, smartphones, personal digital assistants (PDAs), gaming devices, digital still cameras, digital movie cameras, and portable media players. For portable memory card applications, a host may include a built-in receptacle for one or more types of memory cards or flash drives, or a host may require adapters into which a memory card is plugged. The memory system may include its own memory controller and drivers but there may also be some memory-only systems that are instead controlled by software executed by the host to which the memory is connected. In some memory systems containing the controller, especially those embedded within a host, the memory, controller and drivers are often formed on a single integrated circuit chip. The host may communicate with the memory card using any communication protocol such as but not limited to Serial AT Attachment (SATA) protocol, Serial Attached SCSI (SAS) protocol, Nonvolatile Memory express (NVMe) protocol, Secure Digital (SD) protocol, Memory Stick (MS) protocol and Universal Serial Bus (USB) protocol.

The controller 102 (which may be a flash memory controller or device controller) can take the form of processing circuitry, a microprocessor or processor, and a computer-readable medium that stores computer-readable program code (e.g., software or firmware) executable by the (micro) processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address). The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including but not limited to NAND flash memory cells, NOR flash memory cells, Phase Change Memory (PCM), Resistive RAM (ReRam), or Magnetoresistive Random Access Memory (MRAM). The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, memory system 100 may be part of an embedded memory system. For example, the flash memory may be embedded within the host, such as in the form of a solid state disk (SSD) drive installed in a personal computer. In another embodiment, memory system 100 may be a card based system, such as a secure digital (SD) or a micro secure digital (micro-SD) card.

Although in the example illustrated in FIG. 1A, non-volatile memory system 100 includes a single channel between controller 102 and non-volatile memory die 104, the subject matter described herein is not limited to having a single memory channel. For example, in some NAND memory system architectures, such as in FIGS. 1B and 1C, 2, 4, 8 or more NAND channels may exist between the controller and the NAND memory device, depending on controller capabilities. In any of the embodiments described herein, more than a single channel may exist between the controller and the memory die, even if a single channel is shown in the drawings.

Figure 1B:
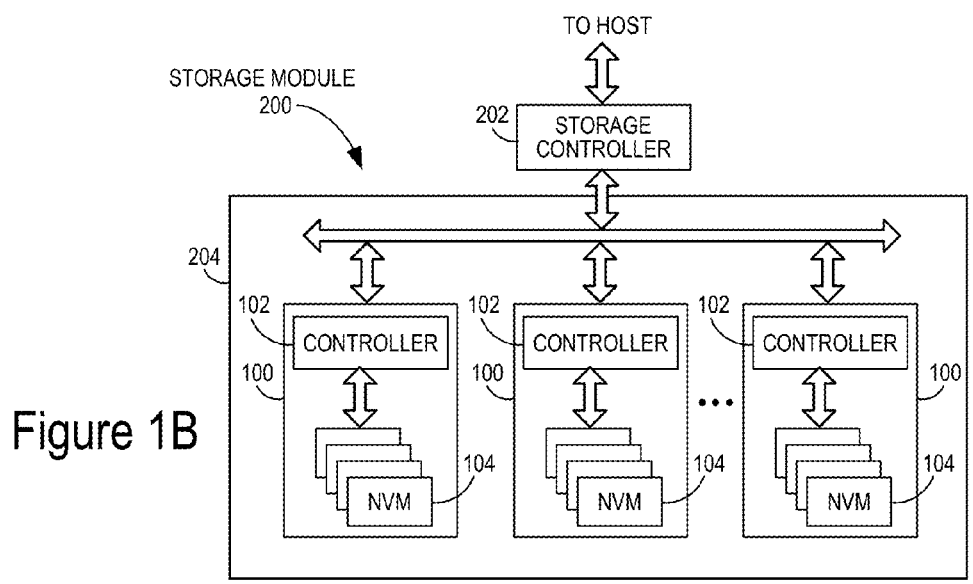
FIG. 1B is a block diagram of a storage module that includes a plurality of non-volatile memory systems.

FIG. 1B illustrates a storage module 200 that includes plural non-volatile memory systems 100. As such, storage module 200 may include a storage controller 202 that interfaces with a host and with storage system 204, which includes a plurality of non-volatile memory systems 100. The interface between storage controller 202 and non-volatile memory systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

Figure 1C:
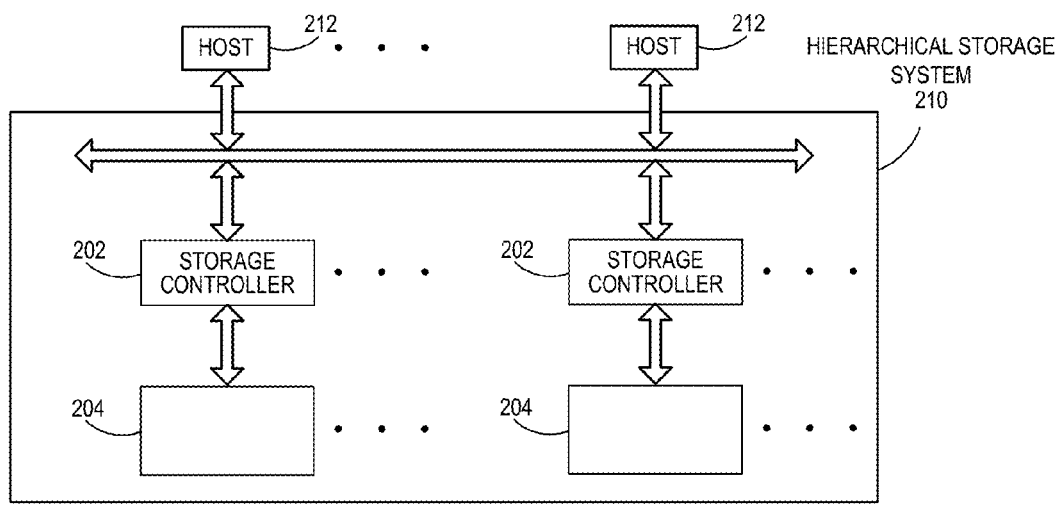
FIG. 1C is a block diagram of a hierarchical storage system.

FIG. 1C is a block diagram illustrating a hierarchical storage system. A hierarchical storage system 210 includes a plurality of storage controllers 202, each of which control a respective storage system 204. Host systems 212 may access memories within the hierarchical storage system via a bus interface. In one embodiment, the bus interface may be a non-volatile memory express (NVMe) or a fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
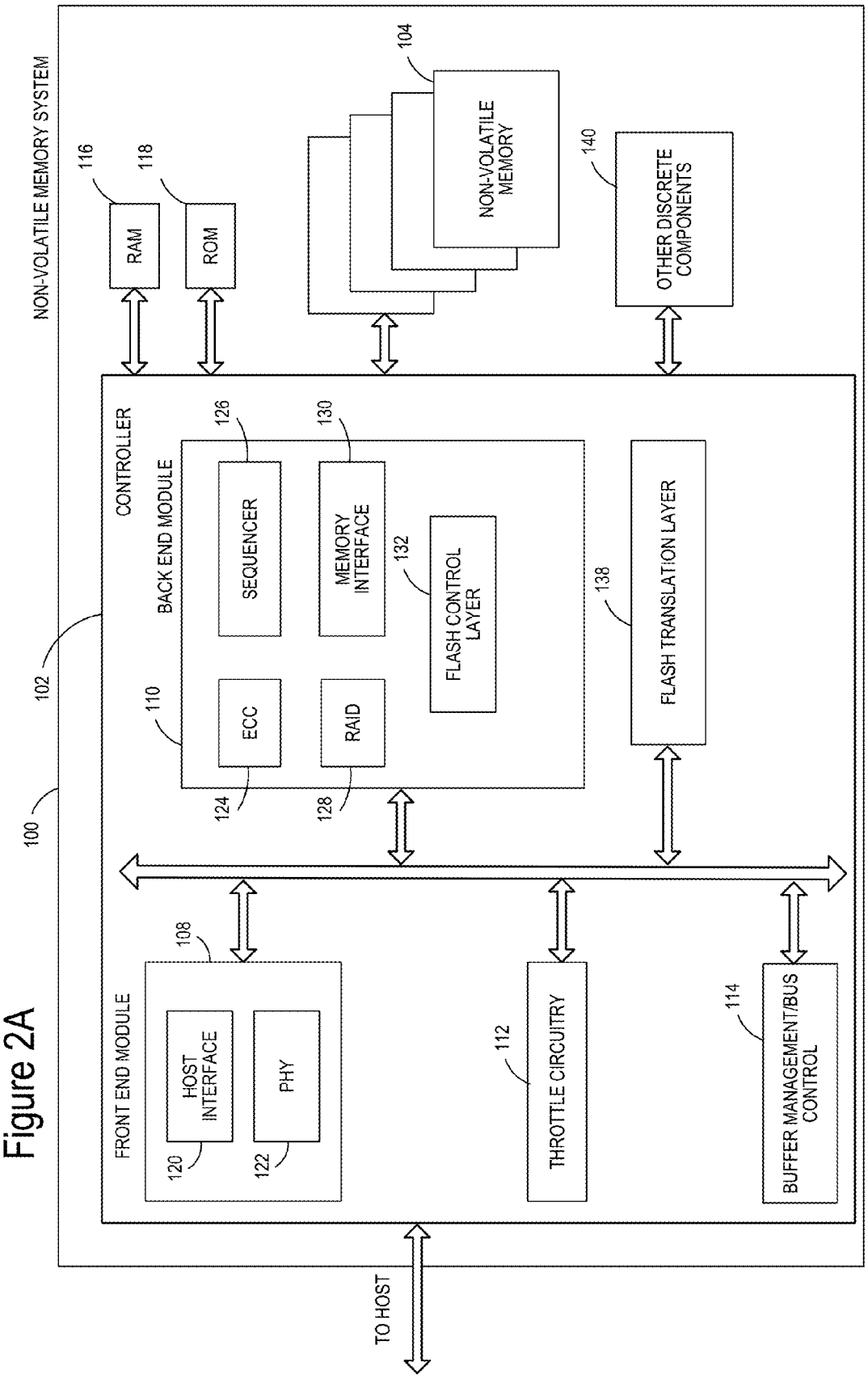
FIG. 2A is a block diagram of exemplary components of a controller of a non-volatile memory system.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail. The back end module 110 may include the queue manager 306 and/or the flash translation layer 138 as shown in and described with respect to FIG. 3.

A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 104, for example, that comprises instructions executable with a processor to implement one or more of the features of the module. When any one of the modules includes the portion of the memory that comprises instructions executable with the processor, the module may or may not include the processor. In some examples, each module may just be the portion of the memory 104 or other physical memory that comprises instructions executable with the processor to implement the features of the corresponding module.

The controller 102 may include throttle circuitry 112. The throttle circuitry 112 may determine when the memory is in a throttle mode and modify parameters for the throttle mode. Although the throttle circuitry 112 in FIG. 2A is shown on the left side of the non-volatile memory system 100, it may be a part of the back end of the memory system 100, such as in the back end module 110 or as part of the flash control layer 132. Alternatively, the throttle circuitry 112 may be coupled with or part of the flash translation layer 138. The queueing functions and throttling functions described below may be performed at the back end of the memory system 100, such as at the back end module 110, the flash translation layer 138, and/or the throttle circuitry 112. The throttling is further described below with respect to FIGS. 4-8.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller. Further, in some implementations, the controller 102, RAM 116, and ROM 118 may be located on separate semiconductor die.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals. As described herein, the software queueing mechanism may be used with a host interface that includes queueing and utilizes a hardware arbitration mechanism.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the non-volatile memory system 100. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of system 100 illustrated in FIG. 2A include flash translation layer ("FTL") 138, which performs wear leveling of memory cells of non-volatile memory die 104. System 100 also includes other discrete components 140, such as external electrical interfaces, external RAM, resistors, capacitors, or other components that may interface with controller 102. In alternative embodiments, one or more of the physical layer interface 122, RAID module 128, and buffer management/bus controller 114 are optional components that are not necessary in the controller 102.

The FTL 138 may also be referred to as a Media Management Layer ("MML"). The FTL 138 may be integrated as part of the flash management or flash control layer 132 that may handle flash errors and interfacing with the host. In particular, FTL may be circuitry responsible for the internals of NAND management. In particular, the FTL 138 may include functionality or an algorithm in the memory device firmware which translates reads/writes from the host into reads/writes to the flash memory 104. The FTL 138 may receive commands (or access a queue of commands) for execution (e.g. programming to the non-volatile memory 104 or reading from the non-volatile memory 104). By accessing a queue of the commands, the FTL 138 can optimally and efficiently select when and how to execute commands from the queue. In one example, the FTL 138 may group commands to increase the efficiency with which the non-volatile memory 104 is accessed. In one example, the FTL 138 may select commands to extend the endurance and lifetime of the non-volatile memory 104.

Figure 3:
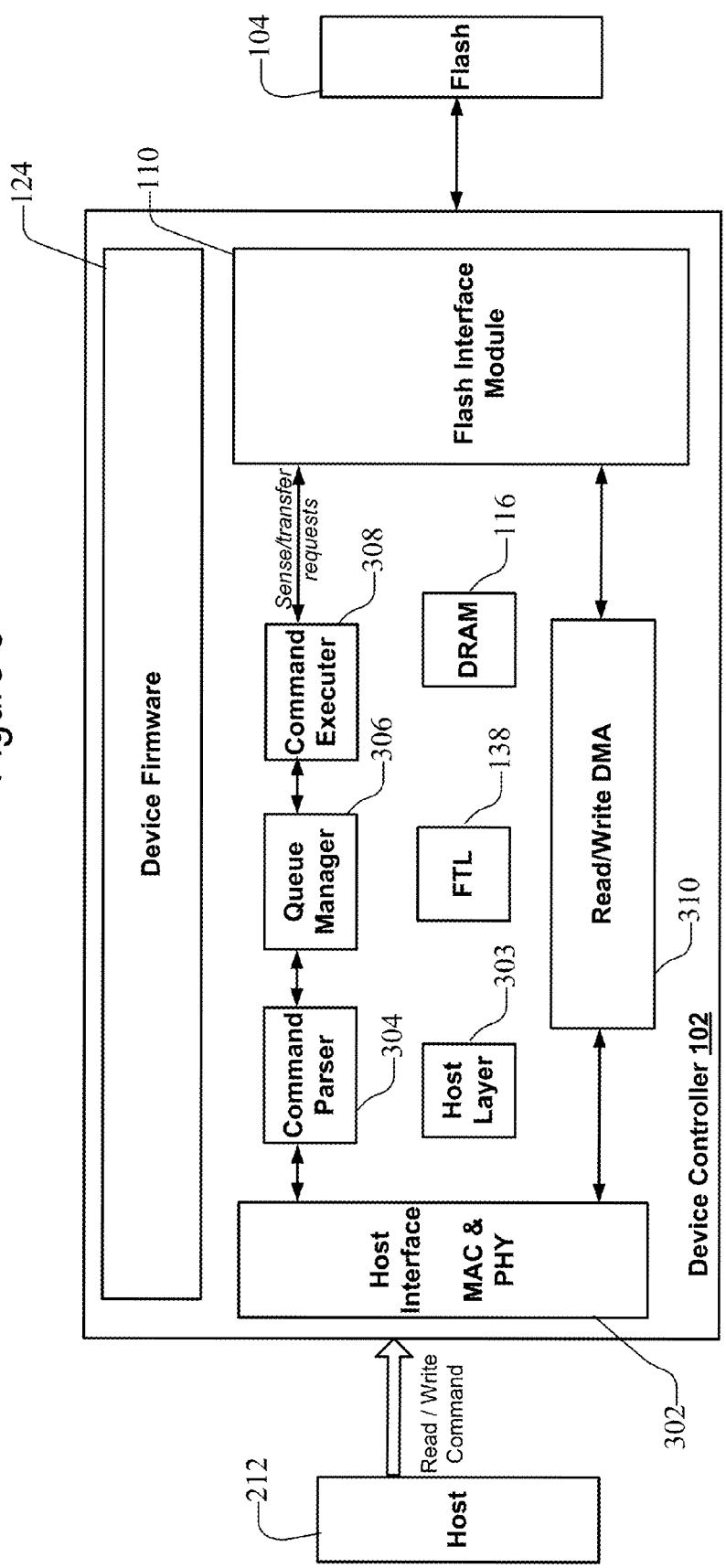
FIG. 3 is a block diagram of a flash device controller.
Figure 4:
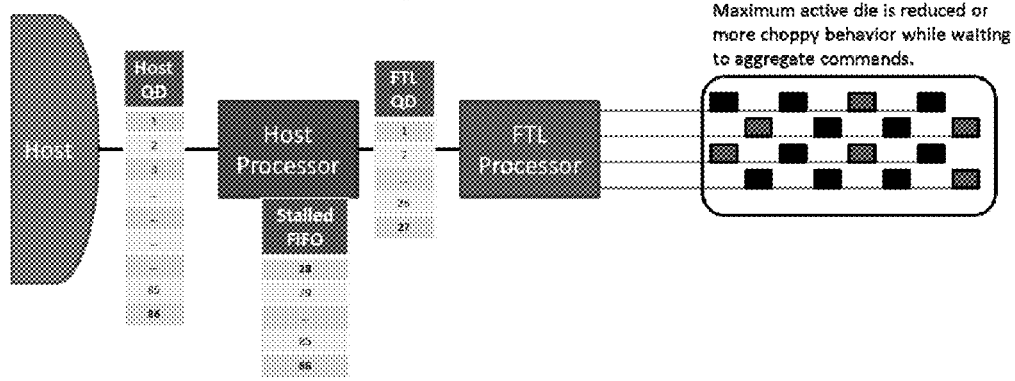
FIG. 4 is a block diagram illustrating queue depths.
Figure 5:
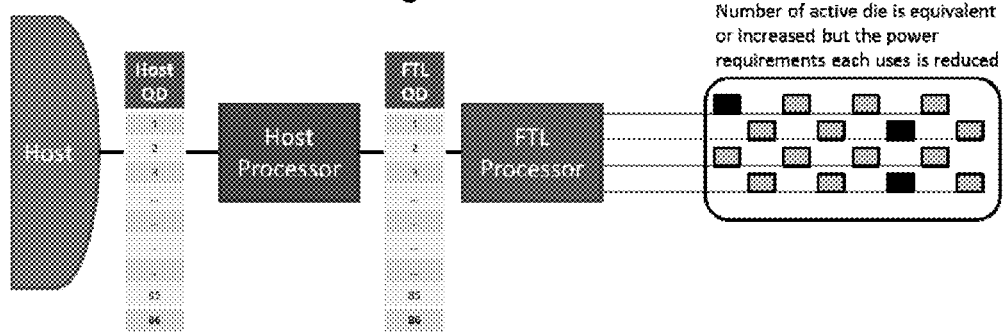
FIG. 5 is an alternative block diagram comparing front end and back end queue depths.

The command queue at the back end (e.g. back end module 110, FTL 138, or throttle circuitry 112) of the non-volatile memory system 100 may include all commands from the front end (e.g. front end module 108) queue. In other words, the front end of the memory system 100 may pass all commands to the back end even during a throttle mode. When the memory system 100 is in throttle mode, the front end does not perform the throttling (i.e. the front end does not maintain a stalled queue) and the back end performs the throttling with the entire queue. FIG. 3 illustrates an alternative embodiment of the front end and back end functionality. FIGS. 4-5 illustrate queues within the memory system. In FIG. 2A, the memory interface 130 may perform the throttling rather than the host interface 120.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data and may be arranged in planes. In one embodiment, each non-volatile memory die 104 may include one or more planes. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to controller 102. Non-volatile memory die 104 further includes a data cache 156 that caches data. Exemplary peripheral circuitry 141 may include clocks, pumps, ESD, current shunt, current sink, and/or closely-packed logic circuits.

FIG. 3 may be a portion of FIG. 1 or may illustrate an alternative embodiment. FIG. 3 illustrates an embodiment of the device controller 102, its internal block and their interactions. The host 212 sends commands to the device controller 102 using a physical interface which connects the host to the memory device controller 102. There are many protocols defined in the industry for this interface such as Peripheral Component Interconnect Express (PCIe), SATA and etc. The host interface (MAC and PHY) 302 may implement three low protocol layers (Transaction layer, Data Link layer and Physical layer). The responsibility for the host interface 302 may be to make sure that packets are transferred between the host 212 and the memory device controller 102 without the errors defined in those layers.

The command parser 304 receives the operation as well as the admin host commands, parses them and checks the correctness of the host commands. It may interact with the queue manager 306 in order to queue the commands to the appropriate queue. Before executions, host commands may be pending with the queue manager 306. The queue manager may include an arbitration mechanism for prioritizing commands to be executed by the command executor 308. The FTL 138 may optimize (prioritize and group) the commands in the queue. There may be numerous read and write accesses simultaneously (listed in a command queue), which may require management through an arbitration or optimization mechanism provided by the queue manager 306. One exemplary arbitration mechanism is round robin or weighted round robin, which may be used for NVMe in one example. The arbitration mechanism may be used to determine priority of commands in the queue for ensuring that high priority commands are queued for execution before lower priority commands. The command parser 304 or the queue manager 306 may be responsible for controlling the flow of data between the controller and the device by ordering requests or commands in the queue. The order may be based on priority of the request, availability of resources to handle the request, an address need for the request, age of the request, type of request (e.g. read or write), or access history of the requestor.

A command queue may be a queue for enabling the delay of command execution, either in order of priority, on a first-in first-out (FIFO) basis, or in any other order. Instead of waiting for each command to be executed before sending the next one, the program just puts the commands in the queue and can perform other processes while the queue is executed. A queue may be used to control the flow of data between the controller and the device. Commands may be placed in the command queue and ordered by the queue manager 306. The order may be based on priority of the request, availability of resources to handle the request, an address need for the request, age of the request, or access history of the requestor. Although not shown in FIG. 3, command queue may be accessible by the FTL 138 for execution. The queue manager 306 may be part of the memory back end (e.g. flash interface module 110).

The host interface 302 may coupled with a host layer 303 for receiving commands from the host 212. Those commands may be stored in a front end command queue. However, those commands are passed to the back end without throttling even during a throttle mode. In other words, the throttling of commands from the command queue may be performed by the back end (e.g. flash interface module 110) and the FTL 138.

Command executer 308 may be a part of the FTL 138 that is responsible for command selection and execution. Pending commands may be arbitrated by the queue manager 306 to select the next command for execution by sending sense and transfer requests to the flash interface module ("FIM") 110. In one embodiment, the FIM 110 may generate the sense/transfer or program operations to the flash 104. FIM 110 interacts with the flash memory 104 by sending flash commands.

The flash management from the flash transformation layer (FTL) 138 may be responsible for internal memory management operations such as address translation. The FTL 138 may also be referred to as the media management layer (MML). The device controller may include a read/write direct memory access ("DMA") 310 which may be responsible for transferring data between the host and the device. The command parser 304, queue manager 306, flash management 138 and command executer 308 may be responsible for handling the control path in the device, while the read/write DMA 310 handles the data path in the device. Device firmware 124 may control and manage the functionality of this logic. At the initialization phase, the firmware may configure the device controller 102. During operation, the firmware 124 controls the logic and manages the flash memory 104. The firmware 124 may also assist with the command parsing and queue storage and access.

In one embodiment, command executer 308 may queue sense and transfer requests to the flash commands queue 312. FIM 110 may use this information for sending commands to the flash memory 116. The sense/transfer requests may include other parameters that assist FIM 110. For example, sense requests may include the flash address while transfer requests may include the amount of data to be read from the flash memory 104.

FIG. 4 is a block diagram illustrating queue depths. FIG. 4 may be an alternative embodiment of FIGS. 2A-B and FIG. 3. FIG. 4 illustrates that host provides a host queue depth ("QD") that illustrates a command queue that is provided to the host processor. A portion of the host QD is not provided to the back end as shown as the stalled first-in-first-out (FIFO) queue. The throttling of commands may require a stalled first in first out ("FIFO") queue for those commands that were throttled, which results in a command backlog. Since the stalled FIFO queue includes commands that that are not initially passed to the back end or FTL, the FTL queue depth ("QD") is shorter than the host QD. In other words, the FTL processor does not have access to all the commands in the host QD because a portion of those commands were stalled. This may occur during a throttling operation when processing is slowed for any number of reasons. Those commands from the host QD that are throttled are in the stalled FIFO queue. The result may include reducing the maximum number of active die with inconsistent behavior while waiting for aggregate commands.

FIG. 5 is an alternative block diagram comparing front end and back end queue depths. In FIG. 5, the host QD at the host processor is not throttled. Accordingly, there is no backlog of stalled commands as shown in FIG. 4. Accordingly, the FTL QD matches the host QD. As a result, the FTL processor can operate more efficiently by having access to all the commands from the host QD (since host QD and FTL QD are the same). The FTL processor can more efficiently group and select commands to execute. In other words, the throttling in FIG. 5 is moved from the host interface (i.e. host processor) to the back end with the FTL processor. As a result, the number of active die is equivalent or increased while the power or temperature requirements for each may be reduced. As described, extraneous firmware handling of the stalled FIFO may be removed while increasing the endurance of the memory.

The FTL may execute commands from the queue based on efficiency. For example, commands that are serial (even if not serial in the queue) can be executed together. In particular, the FTL may aggregate commands from the queue to improve execution speed and efficiency. Accordingly, when the QD is larger, the efficiency gain will increase. Likewise, a small QD does not allow for large efficiency gains. The greater the QD, the greater the chance of filling in holes and finding complete segments to group together. In other words, the FTL may be optimized for greater queue depths, so shifting the throttling away from the host interface or front end and moving it to the flash interface or back end allows for the FTL to operate more efficiently. In one embodiment, the optimization may include the grouping together of commands (e.g. serial commands that may not be consecutive in the queue).

The queueing described herein may be used within an architecture or protocol that supports queueing, such as Non-Volatile Memory Express (NVMe). NVMe is merely one example of a protocol that utilizes queueing and other protocols are possible. NVMe is merely one example of a host controller interface with a register interface and command set which may be applicable to systems that use Peripheral Component Interconnect Express (PCIe) solid state discs (SSDs). NVMe may include multi-queue based communication with host and controllers writing to submission and completion queues in host memory. NVMe is a submission/completion queue-based protocol where commands are created by the host and placed in a submission queue. A completion queue may signal to the host that the commands have been executed. When a submission command is ready in the submission queue, the device fetches the submission command from the host memory. The submission command may be executed according to its priority defined with an arbitration scheme.

There may be a non-volatile memory throttling mode which allows the memory interface to selectively throttle. The throttle mode may be activated when throttling is necessary for any number of reasons. For example, power consumption, temperature issues, endurance issues, or performance consistency may be times when the throttling mode may be used. The FTL throttling may include an identification and adjustment of commands. In one embodiment, the throttling may include a re-ordering of commands. In another embodiment, certain commands may be identified and modified. For example, read commands may be identified and the read operation may be slowed down. In another embodiment, the commands may be altered to execute under different automated, stepped, or controlled operations. For example, a program that is frequently automated through several internal states may be changed to require controlled stepping through more smaller steps with a different validation routine in the NAND.

Figure 7:
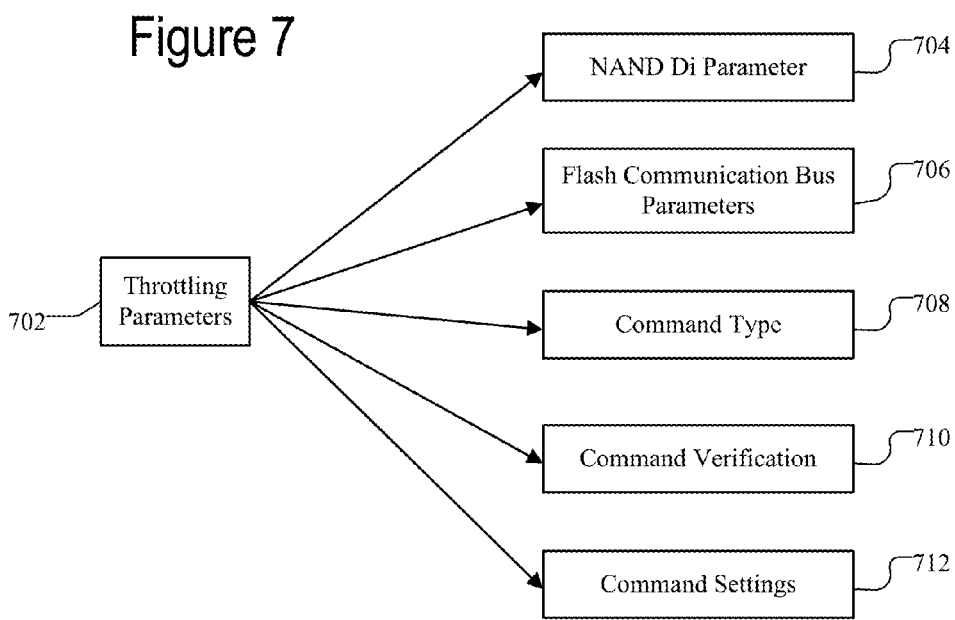
FIG. 7 is a diagram illustrating exemplary memory parameters.

FIG. 6a is a flow chart for executing throttle mode. In FIG. 6a, a command is received at a memory/NAND device from a host in block 602. In block 604, the command is passed or handled by the flash translation layer ("FTL"), such as FTL 138 from FIG. 2A or FIG. 3. The FTL may determine whether a throttle mode is active in block 606. In one embodiment, the entire memory device may be subject to throttle mode, or alternatively, select portions of the memory (e.g. memory di) may be subject to throttle mode individually. When in throttle mode, NAND parameters are modified in block 608. Exemplary throttling parameters are illustrated in FIG. 7 and described below. The throttling parameters may also be referred to as NAND parameters. When not in throttle mode, the NAND parameters are the standard or default values in block 610. The command is executed in block 612 with either modified NAND parameters 608 or standard NAND parameters 610.

FIG. 6b is an alternative flow chart for executing throttle mode. FIG. 6b illustrates an exemplary embodiment with the flow of work through hardware and firmware being similar. In particular, when the flow of work needs to do the throttled read, the lookup pointer, linked list, or array may now be swapped to be the throttled. The FW or the HW may operate the same, and may be running through a new list of ordered commands. The throttle mode determination in block 614 is used for modifying NAND parameters in block 616. If the throttle mode determination in block 614 is that there is no throttle mode, then the NAND parameters in block 616 are not modified. The alteration of the command list that is executed may be performed in each of the NAND. The alteration of the NAND or bus parameters may be by sending a non-data command to the flash bus hardware or sending a non-data command to the NAND dies altering their behavior/settings. In other words, the alteration may be temporarily permanent until the alteration is later undone and the original parameters are restored.

FIG. 7 is a diagram illustrating exemplary throttling parameters. Because the memory device may include NAND memory in one embodiment, the throttling parameters may be referred to as throttling parameters 702. The throttling parameters 702 are features that can be adjusted when in throttle mode. As described, the memory device may be throttled for various reasons (e.g. power usage, temperature, endurance, etc.) and upon throttling, the throttling parameters 702 are exemplary features that are changed.

The die parameter 704 may include a number of parameters related to the NAND di. For example, the clock rate may be reduced in throttle mode. In particular, the clock rate can be slowed down. Circuitry usage may reduce because whenever the device is turned on, it may be using power. The slower the clock rate then the less that power will be. It may never disappear but a lower clock rate can decrease idle power. This is a savings on both thermal power that you have to dissipate and also it may be a savings if there is a power cap, such as if there is a total usage limit on the memory device. In other words, the device clock rate reduction may be effective both at idle when the NAND memory is not even be utilized and also when a command is actually being used. Since the commands slow down, this reduces the power consumed which results in a lower temperature generated by the activity in the NAND. In another embodiment, the die parameter 704 may include turning off SRAM buffers as another throttling mechanism. Alternatively, the operating voltage of the die may be changed as part of the throttling. The operating supply voltage may be set at the PCB level. Lowering the voltage may lower the power during throttle. As a result, more verification or more segments may be performed because there is a reduced ability for the die to draw power.

In one embodiment, implementation of the throttling may include the FTL changing the flash interface module's sequence of events that it will run in order to execute a program or a read. This may be a one-time global setting so that the FTL can make a one-time command and it will send the command down to the flash interface module. The flash interface module may distribute it to the flash and request a change in a NAND parameter (e.g. lower NAND clock rate). It may be used for lower power states or powering down peripheral non-essential circuitry in NAND such as higher powered memory buffers. This may be a trim setting (i.e. a setting within each of the dies). It may be queued such that the flash runs slower when we are not throttled. It may send a new command regarding the clock rates. In an alternative embodiment, the throttling may be specific to a channel, or die such that only part of the NAND is throttled.

The flash communication bus parameters 706 may be another example (s) of throttling parameter(s) 702 that are adjusted for throttling. In one embodiment, the communication bus parameters 706 may include different rates or bus speed for data and commands. The flash bus may include a communication pathway between the flash interface module and the flash. There may be a clock rate associated with it and this can be a power savings within the SSD. It may be a one-time change that determines that flash bus speed is reduced such that communication is slower. In an alternative embodiment, there may not be a one-time global setting for the throttling (such that the throttling parameter is changed during throttling). There may be a throttling that is on a command basis rather than a global setting. The throttling may be for a certain time period and/or specific to a particular channel and/or a particular die that is specifically throttled. Flash bus data transfer size may be another flash communication bus parameter 706 that is adjusted for throttling. Small data transfers mean the die is busy transferring more data packets to the controller. This burns more time and delays future activity for that NAND die.

The controller could throttle particular commands or types of commands 708. The command type throttling may include changing a segmented or continuous command. The may apply to both program and erase commands. For example, segmented commands may include a series of incremental programs that may step toward the voltage to be reached. This may be stepped until the threshold is reached. During throttling, the segment amounts (e.g. voltage increments) may be modified. In throttling, a slightly lower voltage may be applied that moves into a program status more slowly. The flash interface module may have a list of sequences in order to do a program. It may want to begin to program to a particular die, so that die is notified by a broadcast to prepare the die. The actual programming may then be by the wordline and block with an address in the die. This sequence after starting to program may include a list of steps. The sequence of steps for segmentation may include one program, a verify, another incremental program step, a verify, etc. There may be several different read senses. Programs and erases also have verification settings that may be changed. There can be no verification, or one of several internal methods may be used. Other methods include a read sense and returning the number of Bit Errors detected immediately after programming.

The command verification 710 may be another NAND parameter that is adjusted for throttling. For a continuous program, the NAND may be setting the segments and checks and see whether it is programmed. This may include changing internal settings to do more verifications or to do softer programs/erases. A change in internal steps so that they are programming more slowly may include different verification.

Command settings 712 may be another example of throttling parameters 702. The speed or safety margins of the memory may be modified. The NAND die use internal circuitry to apply steps and incrementally move the non-volatile state between erased or different bit values. This may be for both erases and programs. The steps to make these state movements may be modified such as by making the steps more numerous, with different durations, different deltas in voltage level applied, different slew rates and settling times, different de-selection voltages on peripheral cells, different ordering of procedures, etc. Any or all of these items may change. Some of them are found to correlate to performance, cell life degradation, endurance, power consumption, Bit Error Rate (BER) on future read, read disturb robustness, data retention at various temperatures, etc. Using the knowledge of throttling type and the characterization work on the above, we can dial in one behavior for standard flow. A different behavior for a power throttled flow. A different behavior setting for temperature throttled flow. A different behavior for performance throttling.

Command settings 712 or command type 708 may include the changes shown in FIGS. 8-12. In particular, FIGS. 8-12 illustrate exemplary flows for different operations. In one embodiment, execution of the processes shown in FIG. 8-12 may be with the process shown in FIG. 14.

Figure 8:
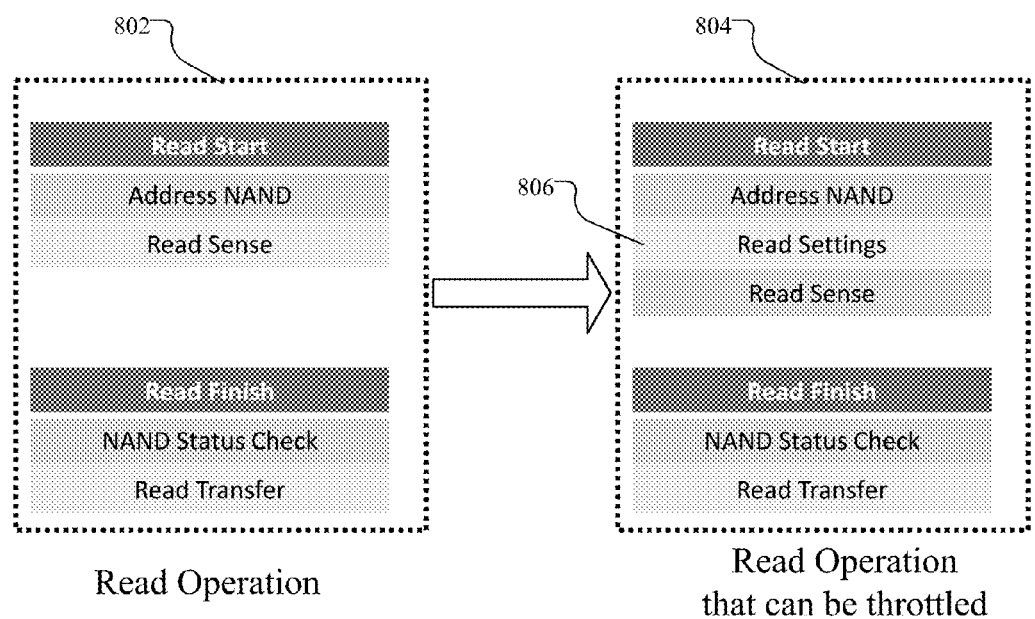
FIG. 8 is a diagram illustrating a read operation.

FIG. 8 is a diagram illustrating a read operation. The read operation 802 includes a read start with an address NAND and read sense, while the read finish has a NAND status check (of the read sense) and a read transfer. The read operation 804 to include throttling, a read settings process 806 is included. Throttling may include changing the read settings. For example, the read communication can be slowed down or the actual read can be slowed. The read settings can be adjusted to allow for a slower reading of queued commands. The command settings 712 include exemplary changes that can be made to the read settings 806.

The standard read operation 802 is to send an address command to the NAND followed by a read sense command. The status of the read is sensed as completed without error, and the read transfer is triggered from the NAND die. In the read operation 804, the command flow through the hardware may still have two different times it goes and executes states "Read Start" and "Read Finish" but this time the read start commands that get sent on the bus is going to be different. This time the address will be sent to the NAND die followed by a read settings 806 change followed by a read sense command. Later the NAND status check can identify when the NAND completed the read sense without error. The read transfer then brings the data back to the bus.

Figure 9:
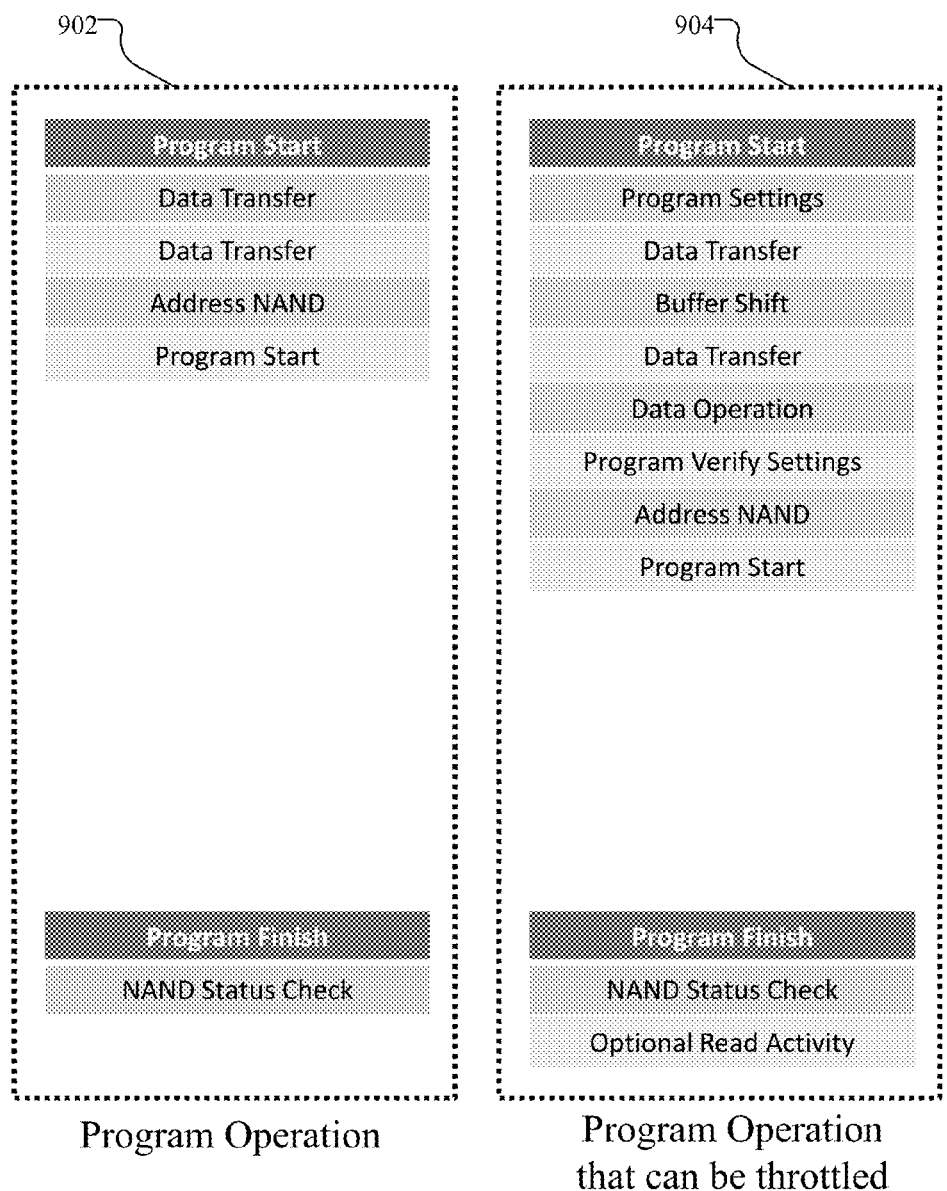
FIG. 9 is a diagram illustrating a programming operation.

FIG. 9 is a diagram illustrating a programming operation. The program operation 902 may include a plurality of data transfers, an address NAND and a program start for the start of the process. The program finish may include a NAND status check of the programming. The program operation 902 may be modified to the program operation 904 with options for throttling. In particular, program settings, a buffer shift, a data operation, and/or program verify settings may be modified or used for throttling. The command settings 712 include exemplary changes that can be made to the program settings or program verify settings. Exemplary changes to program settings include the amount of voltage for moving states, the length of time for a voltage change, the applied voltage to change voltage, the speed of the circuitry, and/or neighboring counteracting voltage to maintain neighbor states. Although not illustrated, there may be a "program initialization" or similar operation that is performed first to provide notification of an upcoming data transfer.

A normal program operation 902 might be as fast and streamlined as a few steps of data transfer followed by NAND address followed by a program start. This would use the assumed default settings parameters that are stored in the die. A program finish routine may confirm that the program was successful. The slowed or throttled program operation 904 may include program settings sent to the device. Even if transferring the same settings as the default, this may take additional time. There may be additional data transfers, buffer shifting, and data movement of the data that was transferred as other ways to slow/throttle operation. There is a data operation that is possible where some math is executed on the data that was transferred into the NAND. The program verify settings and/or program settings can be changed. The program verify settings are verification steps done within the NAND die. The address of where this program data will go is provided and program start commands are issued. When completed, the program will still need to do a "program finish". In the altered program operation 904, there will still be a NAND status check, and the possibility of some read activity for further program verification type reads that are outside of the NAND.

Figure 10:
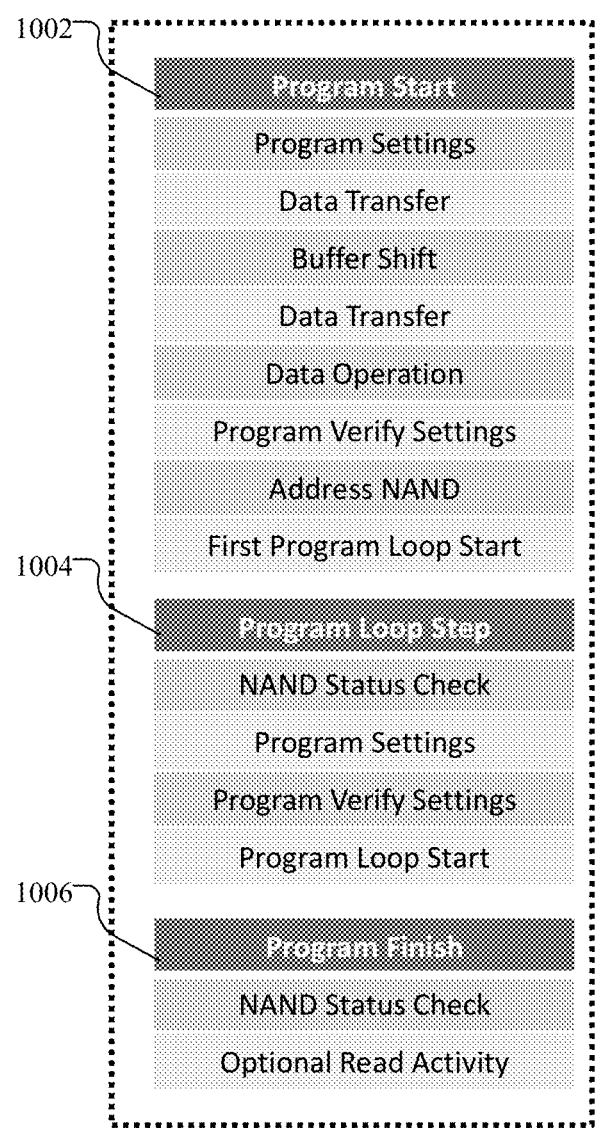
FIG. 10 is a diagram illustrating a looped programming operation.

In a different embodiment, the program can go through similar differentiators with looped programming shown in FIG. 10. FIG. 10 is a diagram illustrating a looped programming operation. The programming loop of FIG. 10 may include a program start 1002, a program loop step 1004, and a program finish 1006. The program loop step 1004 may include program settings and/or program verify settings that may be modified for throttling. The internal states of the program may be manually stepped through by the SSD controller. The program start state 1002 is inside of the controller. The program loop step 1004 inside of the controller executes the program loop step. The loop step may be performed several times to increment the NAND die through each step of activity to incrementally move the non-volatile memory into a completely programmed state. Finally the program finish step 1006 occurs. The extra activity causes extra delays and therefore extra throttling and slowing of activity. The changes can be done in conjunction with using settings that throttle in the desired method. Programming may be quickly with high voltage in a few steps or may include programming with low voltage changes in multiple steps to reach the final voltage. The program settings and/or program verify settings may be modified such that each "loop" slows down the programming. Exemplary changes to program settings include the amount of voltage for moving states, the length of time for a voltage change, the applied voltage to change voltage, the speed of the circuitry, and/or neighboring counteracting voltage to maintain neighbor states.

Figure 11:
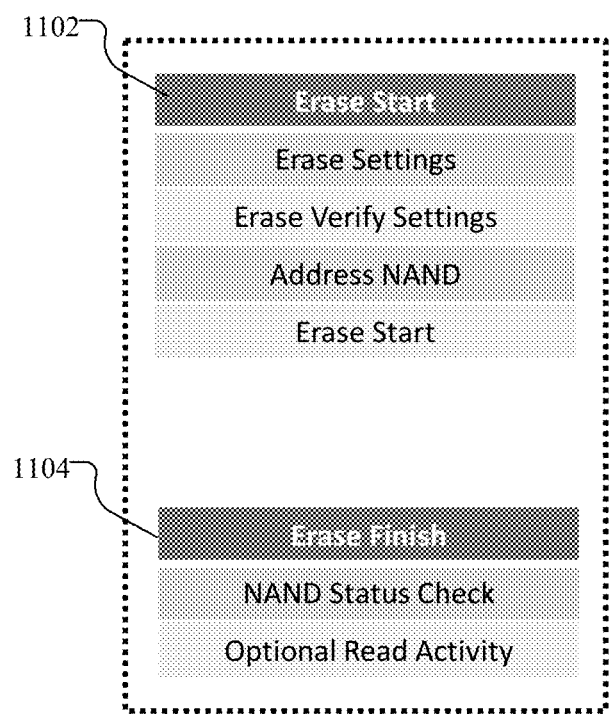
FIG. 11 is a diagram illustrating an erase operation.

FIG. 11 is a diagram illustrating an erase operation. The erase operation includes an erase start 1102 with both erase settings and erase verify settings. The erase finish 1104 may include a status check and optional read activity for the controller to check that data was erased. The erase settings and erase verify settings may be modified during throttle mode.

Figure 12:
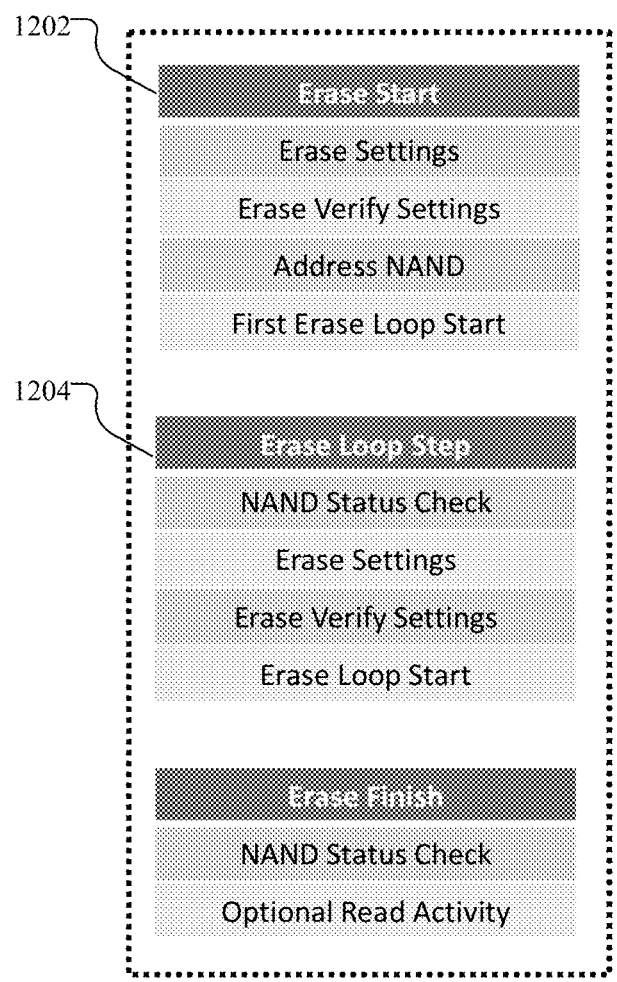
FIG. 12 is a diagram illustrating a looped erase operation.

FIG. 12 is a diagram illustrating a looped erase operation. The erase start step 1202 may include erase settings and erase verify settings. Likewise, the erase loop step 1204 may include erase settings and erase verify settings. During throttle mode, those erase settings and/or erase verify settings may be modified to slow down the erase operation.

FIG. 13 is a flow chart for setting memory parameters. In block 1302, the trim settings are established. The trim settings may include the throttling parameters 702 in one embodiment. In block 1304, instructions may be received for throttling. When in throttle mode, the trim settings may be modified in block 1306. For example, the throttling parameters 702 as discussed in FIG. 7 may be modified for the throttling. In block 1308, the queue of commands is passed from the front end to the back end. In particular, the flash translation layer ("FTL") queue includes all the commands which are not throttled by the host or host processor. The FTL can then throttle the commands with modified trim settings in block 1310.

FIG. 14 is a flow chart for executing commands. The command is received in block 1402. Validation and ordering of the command is performed according to interface and flash handling rules in block 1404. The command is passed to the flash interface module ("FIM") in block 1406. The FIM executes the command in block 1408. This command processing may apply to the commands described above in FIGS. 8-12.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM, PCM, or STT-MRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

In the present application, semiconductor memory devices such as those described in the present application may include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magneto-resistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A nonexhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory. In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

It is intended that the foregoing detailed description be understood as an illustration of selected forms that the invention can take and not as a definition of the invention. It is only the following claims, including all equivalents that are intended to define the scope of the claimed invention. Finally, it should be noted that any aspect of any of the preferred embodiments described herein can be used alone or in combination with one another.

I claim:

1. A storage system comprising:
a memory; and
a controller comprising a first queue and a second queue, wherein the controller is configured to:
store, in the first queue in the controller, a plurality of commands received from a host:
while the storage system is in a throttled mode, pass the plurality of commands from the first queue in the controller to the second queue in the controller, wherein the second queue in the controller is large enough so that all of the plurality of commands stored in the first queue in the controller can be passed to the second queue in the controller; and
group together non-consecutive commands in the second queue in the controller for execution in the memory.

2. The storage system of claim 1 wherein the a queue depth of the second queue matches a queue depth of the first queue.

3. The storage system of claim 1 wherein the first queue is part of a front end of the controller and the second queue is part of a back end of the controller.

4. The storage system of claim 1 wherein the memory comprises a three-dimensional (3D) memory.

5. A method for throttling a storage system comprising:
performing the following in a storage system that is in throttled mode, the storage system comprising a controller:
storing, in a queue in a front end of the controller, a set of commands, wherein some of the commands are serial commands but are stored in non-consecutive locations in the queue in the front end of the controller;
sending the set of commands from the queue in the front end of the controller to a queue in a back end of the controller, wherein even though the storage system in in the throttled mode, the queue in the front end of the controller does not throttle the set of commands; and
aggregating the serial commands.

6. The method of claim 5 further comprising performing throttling by modifying memory parameters.

7. The method of claim 6 wherein the memory parameters comprise at least one of a clock rate, a flash bus speed, a communication methodology, a command type, a command settings, a command verification, speed margins, or operating voltage.

8. The method of claim 5 wherein the back end comprises a flash translation layer.

9. The method of claim 6 wherein the memory parameters comprise trim settings that are modified for the throttle mode.

10. The method of claim 5 wherein the throttle mode provides one or more of the following: reduced power usage, reduced temperature of the memory, alteration of performance to match production drive variability among all drives produced, and improvement of endurance of the memory.

11. A storage system comprising:
a memory;
a controller;
means for storing a set of commands in a first queue of the controller; and means for passing the set of commands from the first queue of the controller to a second queue of the controller even though the storage system is in the throttled mode, wherein a queue depth of the first queue of the controller matches a queue depth of the second queue of the controller.

12. The storage system of claim 11 wherein the throttle mode comprises execution of slower commands.

13. The storage system of claim 12 wherein execution of slower commands comprises reducing a clock rate to slow execution of commands.

14. The storage system of claim 11 wherein throttling is only performed on a back end of the controller.

15. The storage system of claim 11 wherein the second queue is part of a back end of the controller.

16. The storage system of claim 11 wherein the throttle mode provides one or more of the following: reduced power consumption, maintenance of temperature, alteration of performance, and improvement of endurance of the memory.

* * * * *